(12) United States Patent
Yang

(10) Patent No.: US 9,399,152 B2
(45) Date of Patent: Jul. 26, 2016

(54) TRAMPOLINE

(71) Applicant: Wei Yang, Brisbane (AU)

(72) Inventor: Wei Yang, Brisbane (AU)

( * ) Notice: Subject to any disclaimer, the term of this patent is extended or adjusted under 35 U.S.C. 154(b) by 0 days.

(21) Appl. No.: 14/701,889

(22) Filed: May 1, 2015

(65) Prior Publication Data

US 2016/0030794 A1    Feb. 4, 2016

(30) Foreign Application Priority Data

Jul. 30, 2014    (CN) ...................... 2014 2 0425826 U

(51) Int. Cl.
*A63B 5/11* (2006.01)
*A63B 71/02* (2006.01)
*F16B 7/00* (2006.01)

(52) U.S. Cl.
CPC ................. *A63B 5/11* (2013.01); *A63B 71/022* (2013.01); *F16B 7/00* (2013.01)

(58) Field of Classification Search
CPC ....................................................... A63B 5/11
See application file for complete search history.

(56) References Cited

U.S. PATENT DOCUMENTS

| 5,941,798 | A | 8/1999 | Coan |
| 7,708,667 | B2 | 5/2010 | Alexander |
| 8,764,610 | B2 * | 7/2014 | Chen et al. ...................... 482/27 |
| 2002/0137598 | A1 * | 9/2002 | Publicover et al. ............. 482/27 |
| 2009/0062078 | A1 * | 3/2009 | VanElverdinghe ............. 482/29 |
| 2010/0190608 | A1 | 7/2010 | Publicover |
| 2010/0240496 | A1 * | 9/2010 | Chen ............................... 482/27 |
| 2011/0039660 | A1 | 2/2011 | Publicover |
| 2012/0252634 | A1 * | 10/2012 | Ikegami .......................... 482/29 |
| 2014/0221162 | A1 | 8/2014 | Chen |
| 2014/0228176 | A1 | 8/2014 | Miller |
| 2014/0323272 | A1 | 10/2014 | Schaffer |

* cited by examiner

*Primary Examiner* — Oren Ginsberg
*Assistant Examiner* — Jennifer M Deichl
(74) *Attorney, Agent, or Firm* — Jeanette Meng Nakagawa

(57) ABSTRACT

The present invention is a trampoline with a unique frame structure to improve strength, stability and safety. The safety poles of the trampoline are organized in a lattice type of formation with multiple joints. It provides more coverage around the trampoline as a safety mechanism. The lattice type formation also strengthens the safety poles via strategic connections, disperses force asserted onto the safety poles. As a result, the trampoline of the present invention guarantees a safe and stable amount of space for bouncing, suitable for children as well as for adults.

16 Claims, 24 Drawing Sheets

TRAMPOLINE

CROSS-REFERENCES TO RELATED APPLICATIONS

The present application claims priority to a Chinese Utility Model patent application with the application number CN201420425826, filed on Jul. 30, 2014. The disclosures of the priority patent application are herewith incorporated by reference in their entirety.

TECHNICAL FIELD

The present invention relates to a type of recreation and fitness equipment. More specifically, the present invention is a trampoline with a unique frame structure to improve strength, stability and safety.

BACKGROUND OF THE INVENTION

Trampoline is a popular recreational and sporting equipment. In order to prevent injuries arise from accidentally bouncing off the mat, most trampolines erect safety poles to support a safety net around the bouncing mat. Setups of this type of safety mechanism with poles and nets can be appreciated from patents such as: U.S. Pat. No. 7,708,667B2, US20100190608A1, US20140228176A1, and US20140221162A1. One common feature shared by these safety mechanisms is that adjacent safety poles are generally parallel to each other. Safety poles can bend toward the bouncing mat due to the force exerted from the bouncing surface.

One problem with the safety poles bending toward the mat is that it effectively reduces the space a person can utilize vertically while bouncing. The reduction of jumping space is also unpredictable, due to the dynamic force exerted through jumping. This element of uncertainly presents a challenge for the jumper to have to continuously compensate for it in order to avoid hitting the poles. Such a challenge can be particularly dangerous for children, who are in general less aware of the space around them, and require longer reaction time since they are still in the process of learning to avoid obstacles. The tips of the poles, as they bend towards the bouncing person, can also cause scraping injuries if the person is too close to the edge of the bouncing mat.

The present invention is a trampoline with safety poles organized in a lattice type of formation with multiple joints. It provides more coverage around the trampoline as a safety mechanism. The lattice type formation also strengthens the safety poles via strategic connections, disperses force asserted onto the safety poles, and thus prevents them from bending towards the person bouncing on the trampoline. As a result, the inward bending of the safety poles is largely eliminated, and guarantees a stable amount of space for jumping that does not change even as the jumper exerts a great deal of force.

BRIEF SUMMARY OF EMBODIMENTS OF THE INVENTION

The present invention relates to a type of recreation and fitness equipment. More specifically, the present invention is a trampoline with a unique frame structure to improve strength, stability and safety.

In a variant, a trampoline comprises an enclosed frame connected to a mat via a plurality of springs for bouncing, a plurality of leg units connected around the frame to raise the frame and the mat above ground, a plurality of safety units connected to the frame extending upwards to form an enclosure around the frame and the mat, wherein the safety unit further comprises at least two safety poles facing toward each other and are joined together at various locations toward a top section of the safety unit, and a safety net connected to top ends of the safety units via a spring connection, and to an outer edge of the mat at various location all around.

In another variant, the enclosed frame of the trampoline comprises at least one locking mechanism and at least two frame tubes interconnected in succession, with the frame tube locked in position at both a receiving end and an exiting end of the locking mechanism.

In yet another variant, the frame tube further comprises at least one set of slits to allow attachment of springs to the edge of the mat.

In still another variant, the locking mechanism further comprises a connection tube with a receiving end and an exiting end, at least one insertion tube attached from outside to the connection tube to form T junction, with the insertion tube further comprises pairs of openings aligned with corresponding locking features such as a spring loaded push buttons on the leg units and the safety units, and a reinforcement piece attached to the connection tube and to the insertion tube.

In another variant, the leg unit further comprises a foot joint with a bottom surface resting on the ground and at least two upward U shaped plates facing each other, and at least two leg poles with their bottom ends rotatably attached to the corresponding plates on the foot joint, and their upper ends attached to the insertion tube of the adjacent locking mechanisms on the frame.

In yet another variant, the safety pole further comprises interlocking sections lengthwise.

In still another variant, the upper section of the safety pole comprises a contact surface with openings rotatably attached to an opposing safety pole at a corresponding location in the same safety unit to form a junction.

In a variant, an upper end of each safety pole is attached to an upper end of a safety pole from an adjacent safety unit via a sphere joint.

In another variant, the sphere joint further comprises a housing end and a sphere end, wherein the housing end comprising a cavity to allow entry of the sphere end, to allow relative rotation between the cavity and the sphere end, and to block the exit of the sphere end.

In yet another variant, an upper end of each safety pole is attached to one end of a connecting pole and then in turn to an upper end of a safety pole from an adjacent safety unit.

In still another variant, the upper edge of the safety net is attached to a clamp via a spring connection, wherein the clamp further comprises pairs of openings to secure the upper ends of the safety poles.

In a variant, the upper ends of the safety poles are directly connected to the end of the safety net via a spring connection.

In another variant, the spring connection further comprises a spring, latching onto a corner of a triangular link, with an opposing edge of the triangular link secured onto a piece of fabric extension.

In yet another variant, the connection pole further comprises interlocking sections lengthwise.

In still another variant, the bottom surface of a foot joint comprises an anchor that can be driven into the ground to secure the trampoline at a fixed location.

In a variant, a trampoline comprises a first enclosed frame connected to a mat via a plurality of springs for bouncing, a plurality of leg poles connected around the frame to raise the frame and the mat horizontally above ground, a plurality of safety units connected to a second frame on the ground extending upwards to form an enclosure around both frames and the mat, wherein the safety unit further comprises at least two safety poles with their lower ends joined at ground level to a lower end of a safety pole from an adjacent safety unit via a locking mechanism, and with their upper sections facing toward each other and are joined together at various locations toward a top section of the safety unit, and a safety net connected to top ends of the safety units via a spring connections to an outer edge of the mat at various location all around.

In another variant, the plurality of springs can be concealed by a continuous cover for protection.

In yet another variant, the safety poles are encased in soft wrappings to absorb force from collision.

In still another variant, the fabric extension of the spring connection can be adjusted to fine tune the tension of the safety net.

In yet another variant, the spring connection is encased in protective sheath.

In a variant, a trampoline comprises an enclosed frame connected to a mat for bouncing. The enclosed frame comprises a plurality of safety units, configured to support a safety net and form an assembly with the safety net. The assembly forms a barrier disposed around the mat to prevent a user from moving off the trampoline during use. The safety units comprise two spaced apart left and right link members that meet at a first junction point above the mat. Each safety unit is connected to an immediately adjacent safety unit via a connection formed in a top end of the safety unit.

In another variant of the trampoline, the two spaced apart link members cross at the first junction above the mat and each link member connecting to a respective adjacent safety unit.

In a further variant of the trampoline, adjacent safety units are connected at the left link member of one safety unit and a right link member of an adjacent unit.

In still another variant of the trampoline, the two spaced apart link members meet at a second junction below the mat and the safety net is connected the enclosed frame at points of connection between link members.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
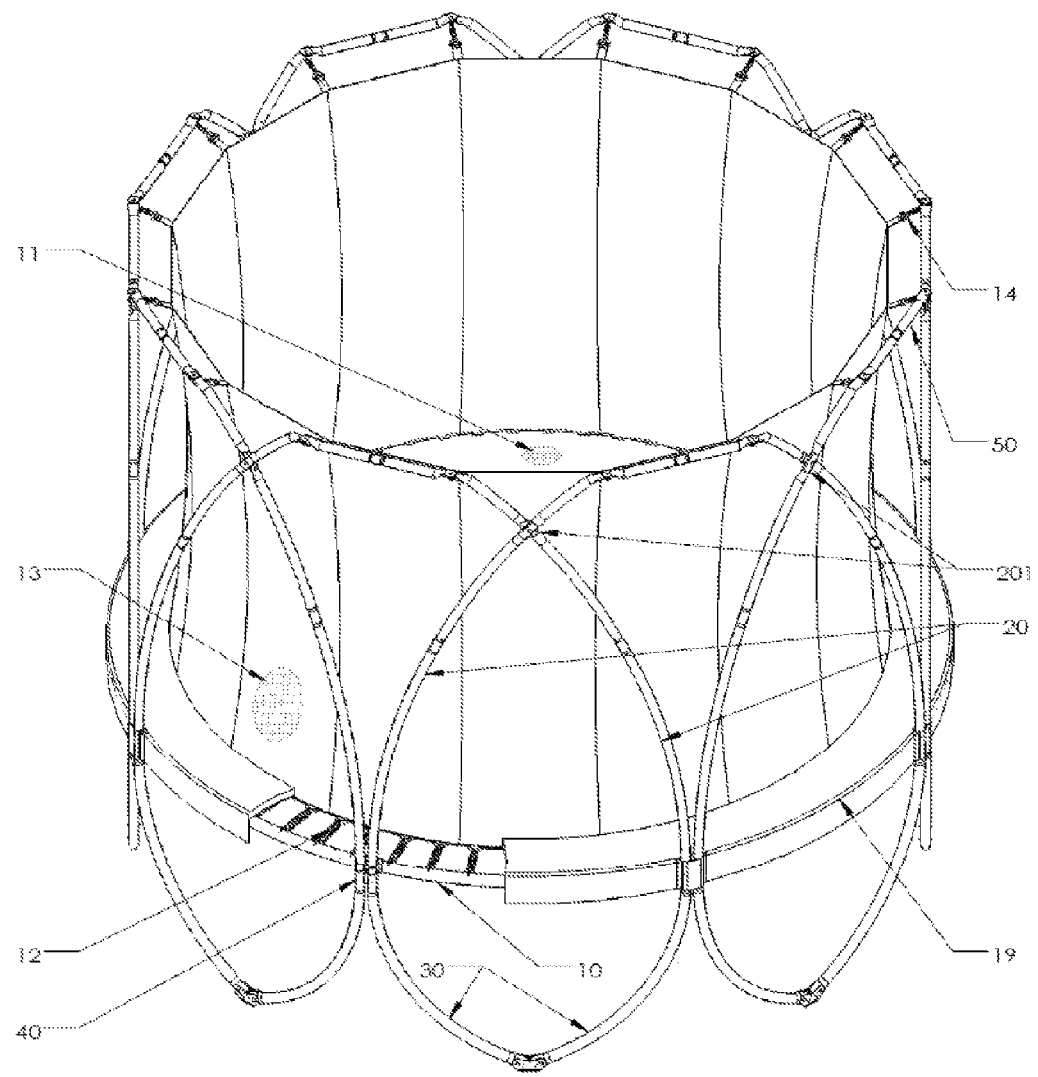
FIG. 1 is a schematic illustration of a trampoline according to some embodiments of the present invention.

FIG. 1 is a schematic drawing of a trampoline according to some embodiments of the present invention. The trampoline comprises an enclosed frame 10, which can take the shape of a circle, an ellipse, a rectangle, a pentagon, and other suitable shapes. A mat 11 for bouncing can be secured to the frame 10 via a series of springs 12. The frame and springs can be concealed under a cover 19 to prevent accidental dislocation of the springs.

The frame 10 and the mat 11 are raised above the ground by a series of leg units 30. A series of safety units 20 surrounds the frame and the mat to form an enclosure above the mat. Safety Units and Leg units are secured to the frame by a series of locking mechanisms 40. In this particular embodiment, the upper sections within the same safety units cross each other to form an X junction 201. The top ends of the adjacent safety units are connected via connecting poles 50. A safety net 13 is secured via a spring connection 14 from the top of the safety units to the outer edge of the mat at regular intervals. Details of each component will be elaborated further in the figures that follow.

Figure 2:
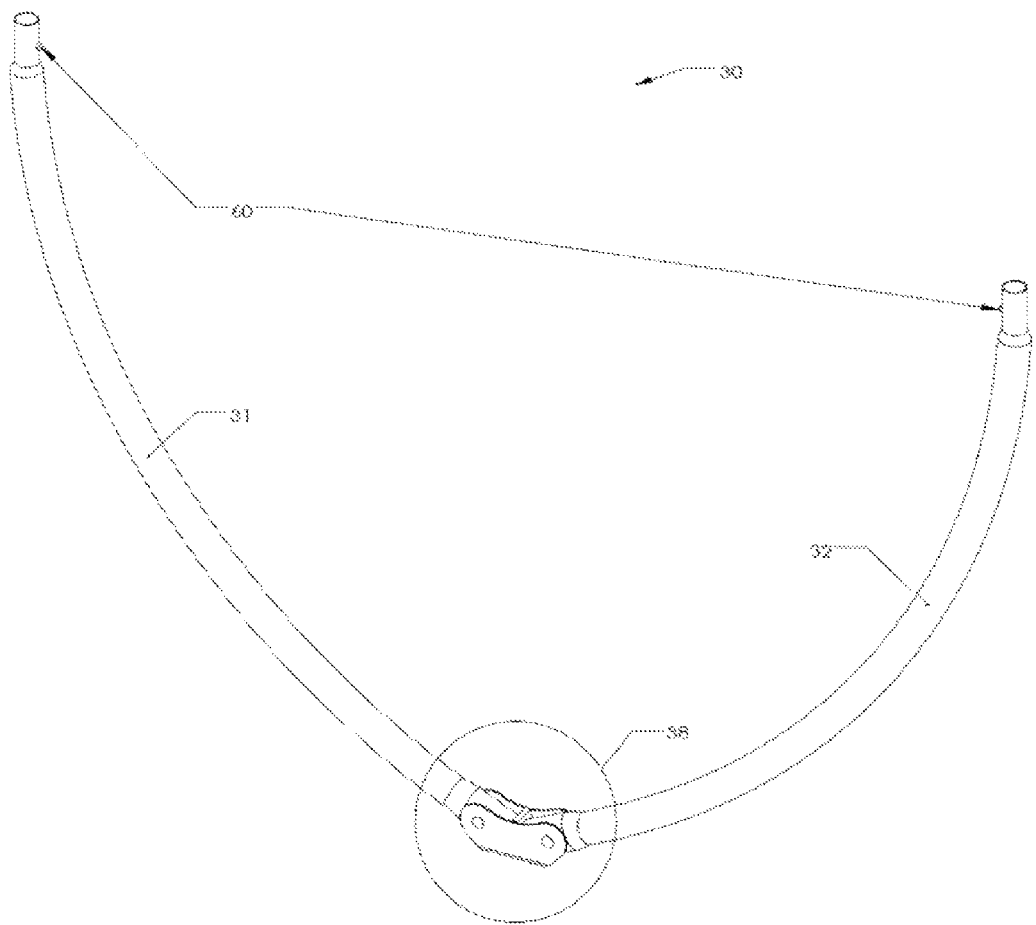
FIG. 2 is a schematic illustration of a leg unit of the trampoline.
Figure 3:
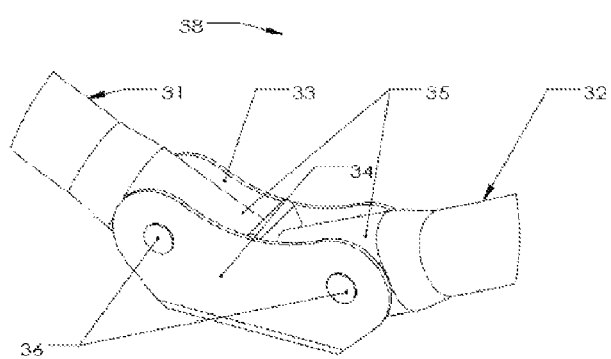
FIG. 3 is an enlarged view of a foot joint of the leg unit of the trampoline.
Figure 4:
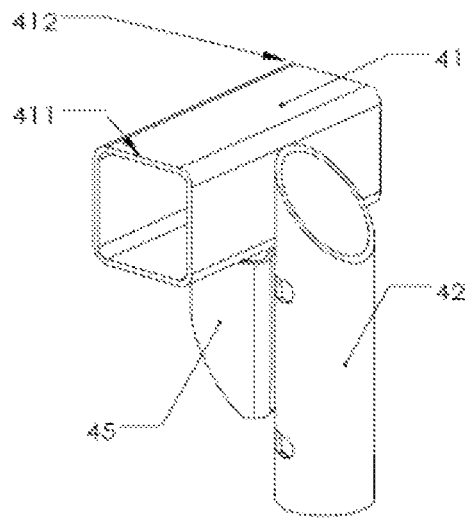
FIG. 4 is a schematic drawing of a perspective view of a locking mechanism of the trampoline, according to some embodiments of the present invention.
Figure 5:
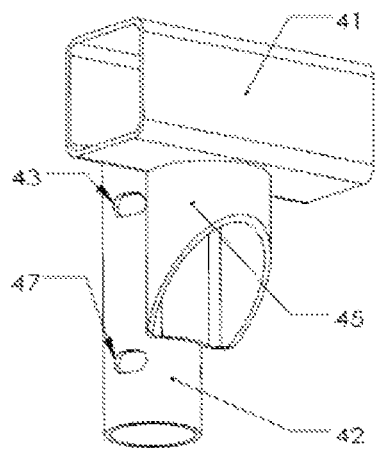
FIG. 5 is a schematic drawing of another perspective view of the locking mechanism of the trampoline.
Figure 6:
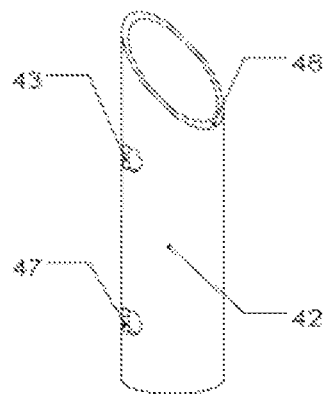
FIG. 6 is a schematic drawing of a section of an insertion tube of the locking mechanism.

FIGS. 2 and 3 illustrate the leg unit 30 in detail. The leg unit comprises mainly a foot joint 38, a first leg pole 31, and a second leg pole 32. The upper ends of the leg poles have locking features such as a spring loaded push buttons 60 and can be snapped into position on the insertion tubes on the locking mechanisms 40 along the frame 10.

Enlarged details of the foot joint 38 are further illustrated in FIG. 3. The bottom surface of the foot joint 38 rests on the ground. In some embodiments, the bottom surface of the foot joint 38 can be fitted with anchors to be driven into the ground so as to secure the trampoline to a fixed location. The foot joint 38 further comprises two plates 33 and 34 with a slight U shaped profile, and mirror image each other. Lower ends 35 of the two leg poles are secured to the two plates via two pins at 36. Rotation of the leg poles 31 and 32 around the pin can be allowed, and therefore the angle between the two leg poles can change with respect to the foot joint. This allows the leg units to absorb and dissipate force applied to the frame as a person bounces on the mat, and also makes assembly and disassembly easier.

FIGS. 4-9 illustrate several embodiments of the locking mechanisms 40 connecting the frame, the leg units, and the safety units of the trampoline. The basic components of a locking mechanism are a connection tube 41, an insertion tube 42, and a reinforcement piece 45.

Figure 10:
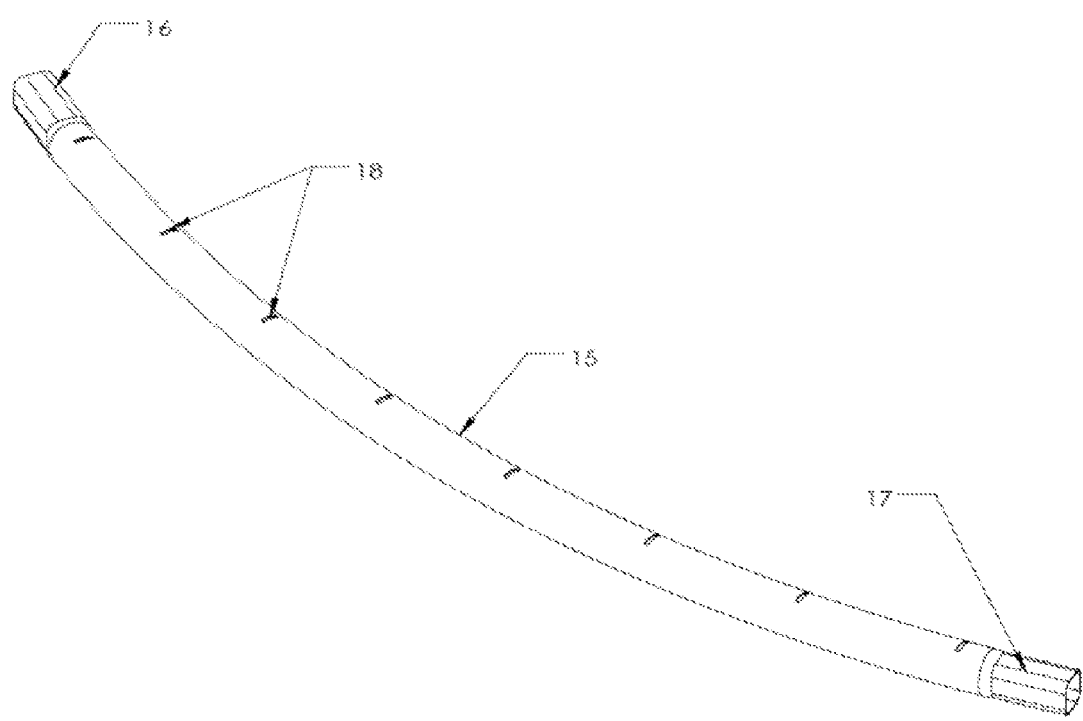
FIG. 10 is a schematic drawing of a frame tube with slits, according to some embodiments of the present invention.

The connection tube 41 has a receiving end 411 and an exiting end 412. A section of a frame tube 15, as illustrated in FIG. 10, has two insertion ends 16 and 17, which can be fitted with either the receiving end or the exiting end of the locking mechanism. The frame 10 of the trampoline comprises frame tubes and ends of the locking mechanisms secured in succession with one another until an enclosure is formed.

An insertion tube 42 is attached to the outside of the connection tube to form a T junction. The insertion tube further comprises pairs of openings 47 and 43, to receive and to secure the locking features such as a spring loaded push buttons 60 and 61 from the leg units and the safety units respectively. The top surface 48 of the insertion tube can be cut in an angle.

Figure 7:
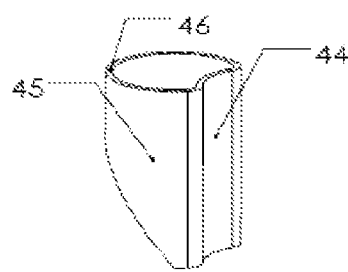
FIG. 7 is a schematic drawing of a section of an reinforcement piece of the locking mechanism

A reinforcement piece 45 is secured against the outside surfaces of both the connection tube and the insertion tube. FIG. 7 illustrates another view of the reinforcement piece 45, where surfaces 46 and 44 are shaped in complimentary to the connection tube 41 and to the insertion tube 42.

Figure 8:
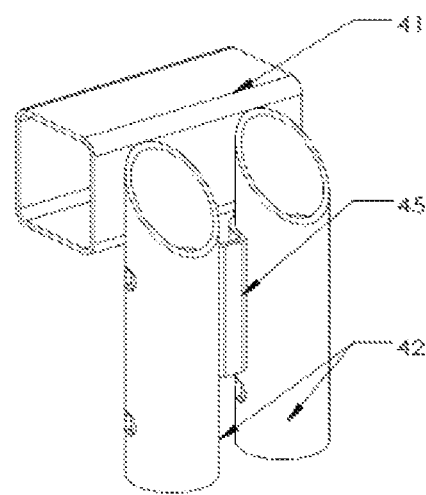
FIG. 8 is a schematic drawing of a perspective view of a variation of the locking mechanism of the trampoline, according to some embodiments of the present invention.
Figure 9:
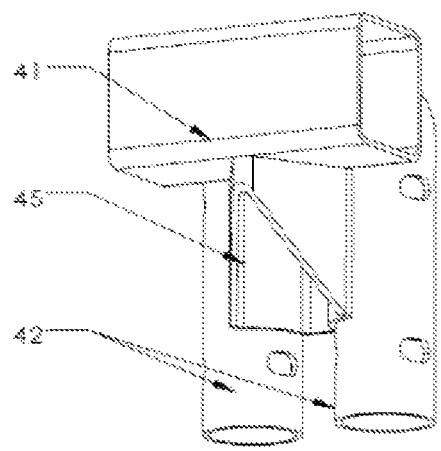
FIG. 9 is a schematic drawing of another perspective view of a variation of the locking mechanism.

FIGS. 8 and 9 illustrate yet another embodiment of the locking mechanism where the connection tube is fitted with a pair of insertion tubes 42 in parallel to each other. A reinforcement piece 45 is shaped to fit in between the two parallel insertion tubes and to secure both with the connection tube.

FIG. 10 is a schematic drawing of a section of a frame tube 15. Series of slits 18 on the frame tube are made to receive and to anchor springs linking the frame to the outer edge of the bouncing mat. The cross section of the ends 16 and 17 of the frame tube 15 can be in any shape, so long as it is shaped to compliment the receiving and existing ends of the locking mechanism 40, either from the inside or from the outside.

Figure 11:
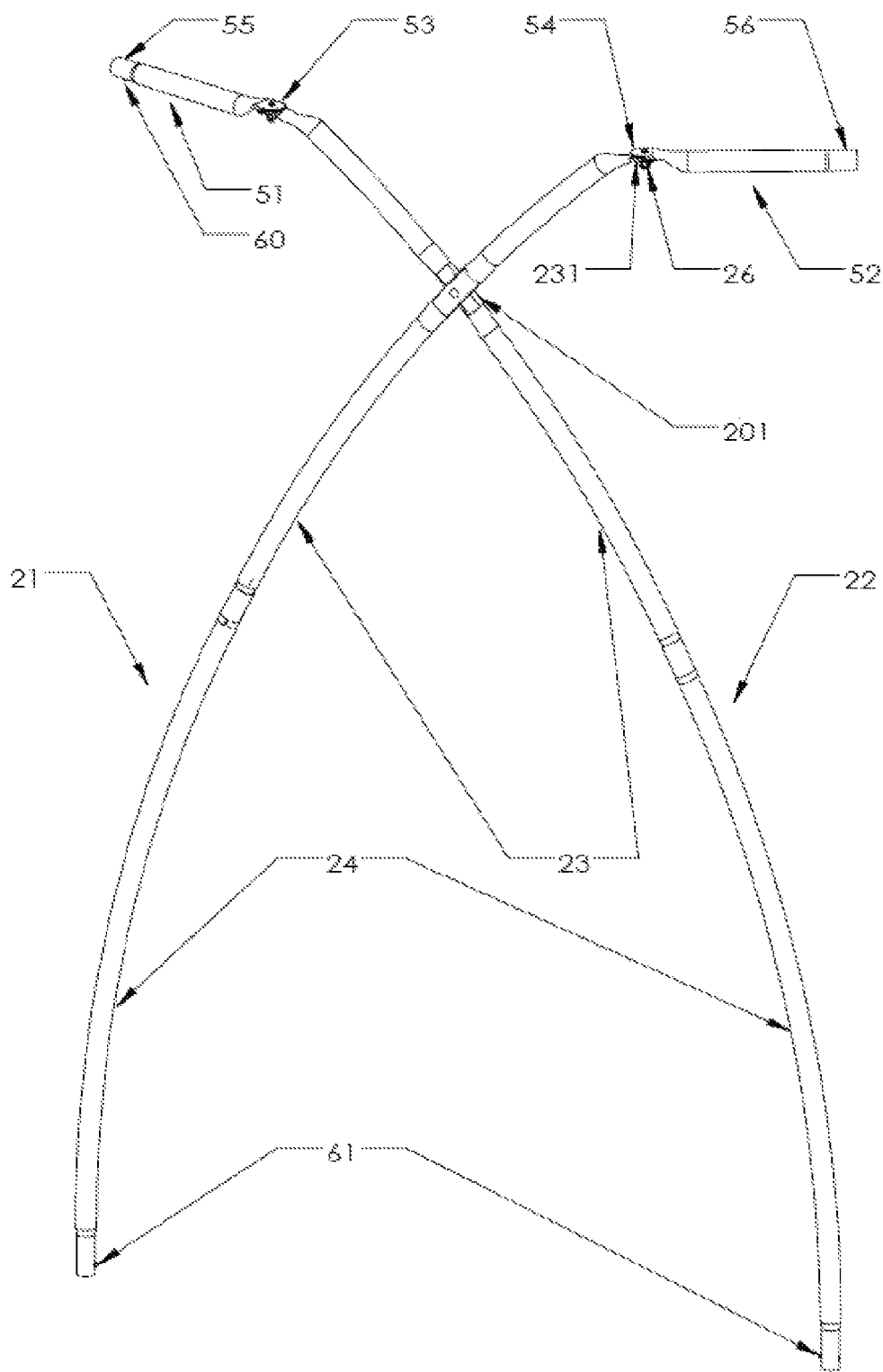
FIG. 11 is a schematic drawing of a safety unit, according to some embodiments of the present invention.

FIG. 11 is a schematic drawing of a safety unit, according to some embodiments of the present invention. Each safety unit comprises a first safety pole 21 and a second safety pole 22. Each safety pole can further comprise an upper section 23, and a lower section 24. More sections can be used for each safety pole lengthwise to account for the height of each pole. The lower ends of both safety poles are fitted with locking features such as a spring loaded push buttons 61, so that they can be snapped into positions on the insertion tubes on the locking mechanisms 40 along frame 10.

The first and second safety poles in the safety unit are arranged to face each other. In some embodiments of the present invention, the two upper sections of the safety poles 23 can be joined at location 201. A plurality of safety units surrounds the mat to form an enclosure. The crossing of the safety poles thus form a lattice type formation and provides more coverage spatially to protect the jumper from accidentally falling outside of the enclosure.

Figure 12:
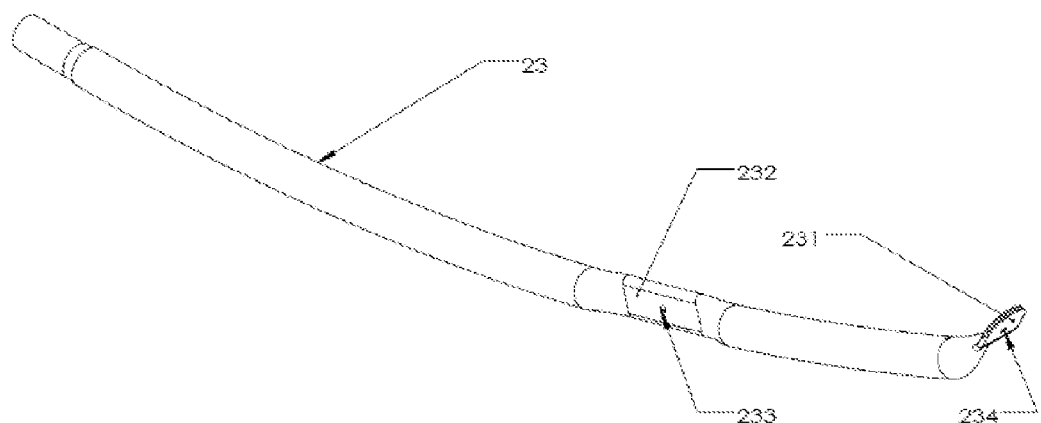
FIG. 12 is a schematic drawing of an upper section of the safety unit.

FIG. 12 illustrates the upper section 23 of the safety pole in more detail. The profile of location 201 on each upper section of the safety pole can be flat, as illustrated as 232, or simply to compliment each other. Each upper section can further comprise an opening 233, which allows both upper sections to be secured together via a pin.

In comparison to designs with parallel safety poles, where each pole bears inward pulling force by itself, the crossing and linking of the safety poles strengthen the safety unit by sharing the force with at least two poles. This design thus allows inward pulling forces to be absorbed and dissipated by linking the poles in a lattice type formation. As a result, the inward bending of the safety unit is largely eliminated, and guarantees a stable amount of space for jumping that does not change even as the jumper exerts a great deal of force.

Figure 13:
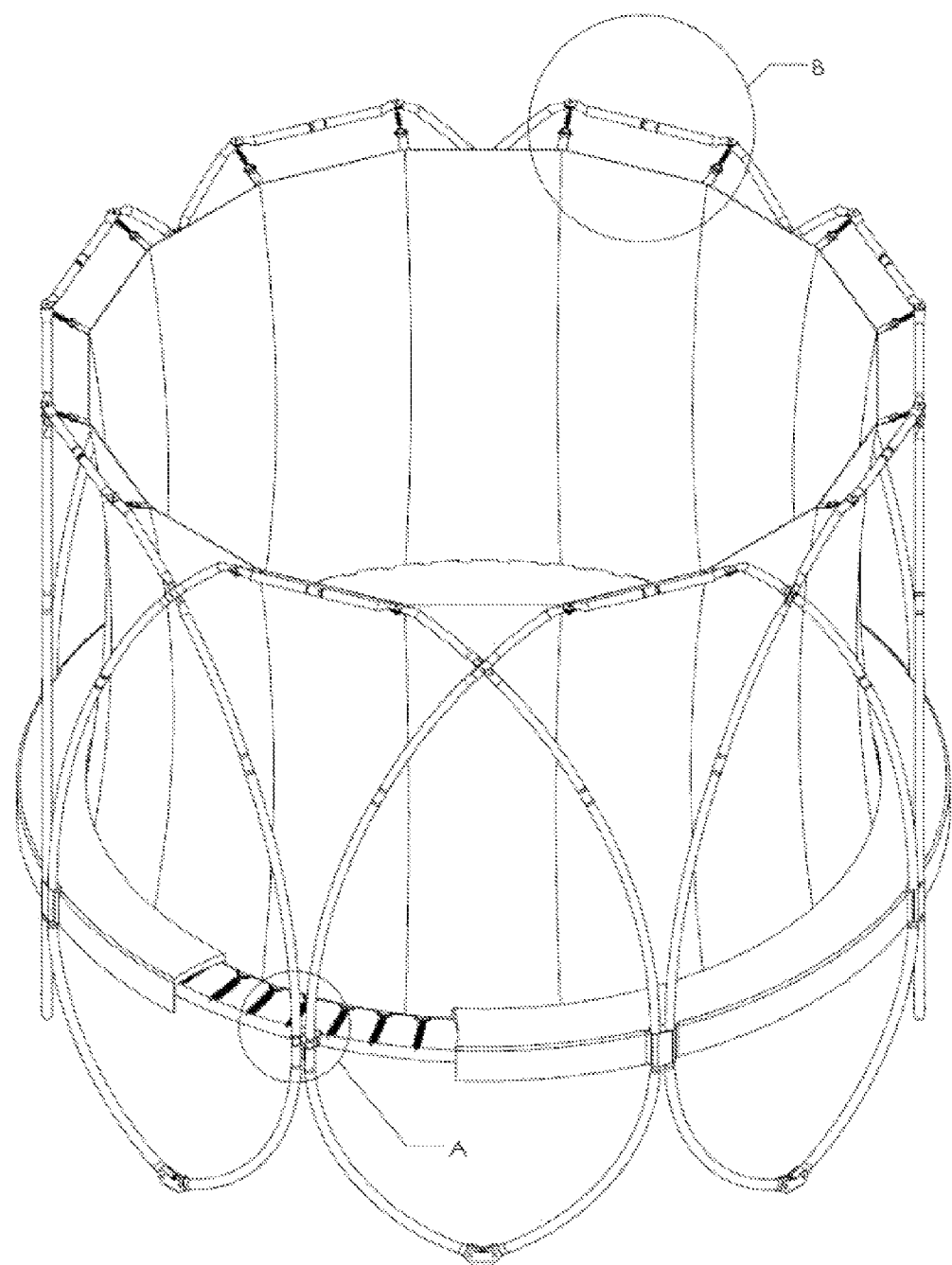
FIG. 13 is a schematic illustration of a trampoline, where the tops of adjacent safety units are connected via a connecting pole, according to some embodiments of the present invention.
Figure 14:
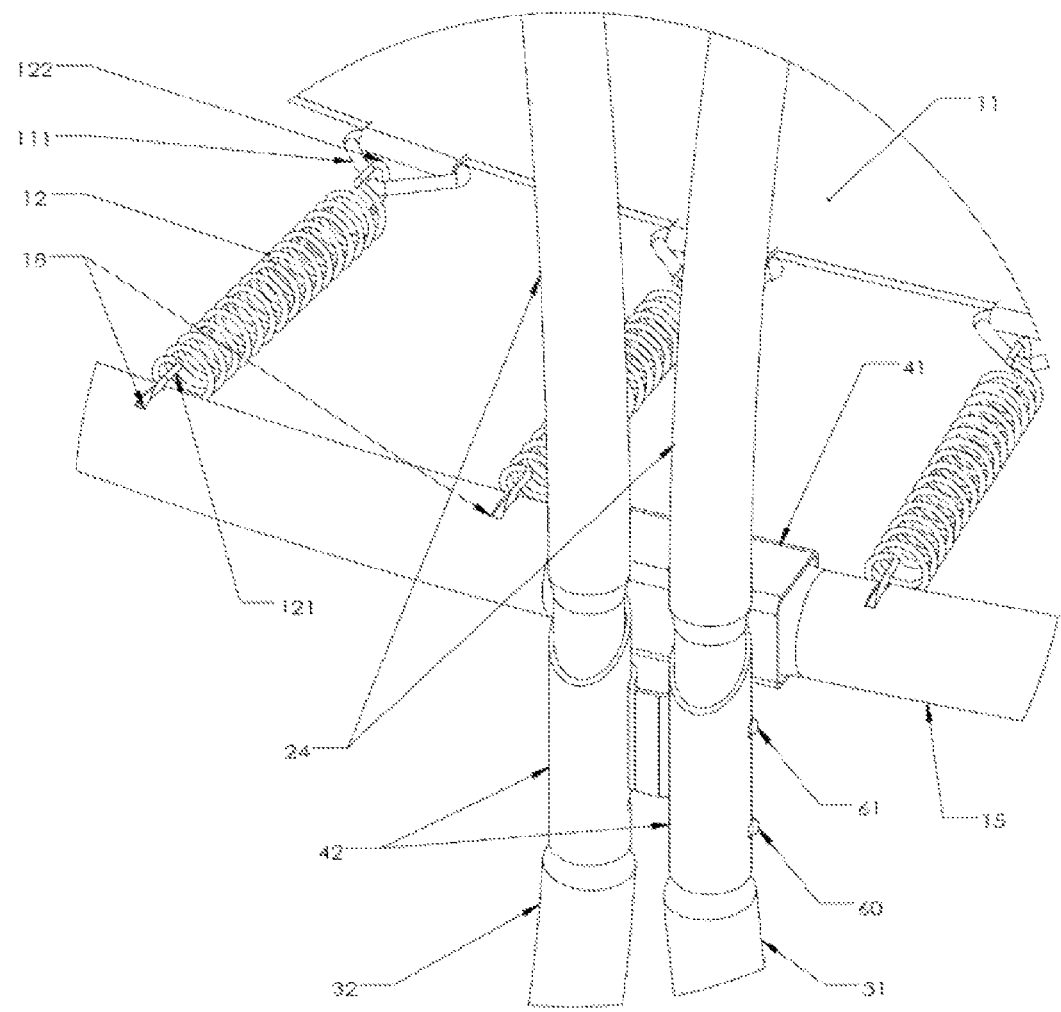
FIG. 14 is an expansive view in detail of area A from FIG. 13.
Figure 15:
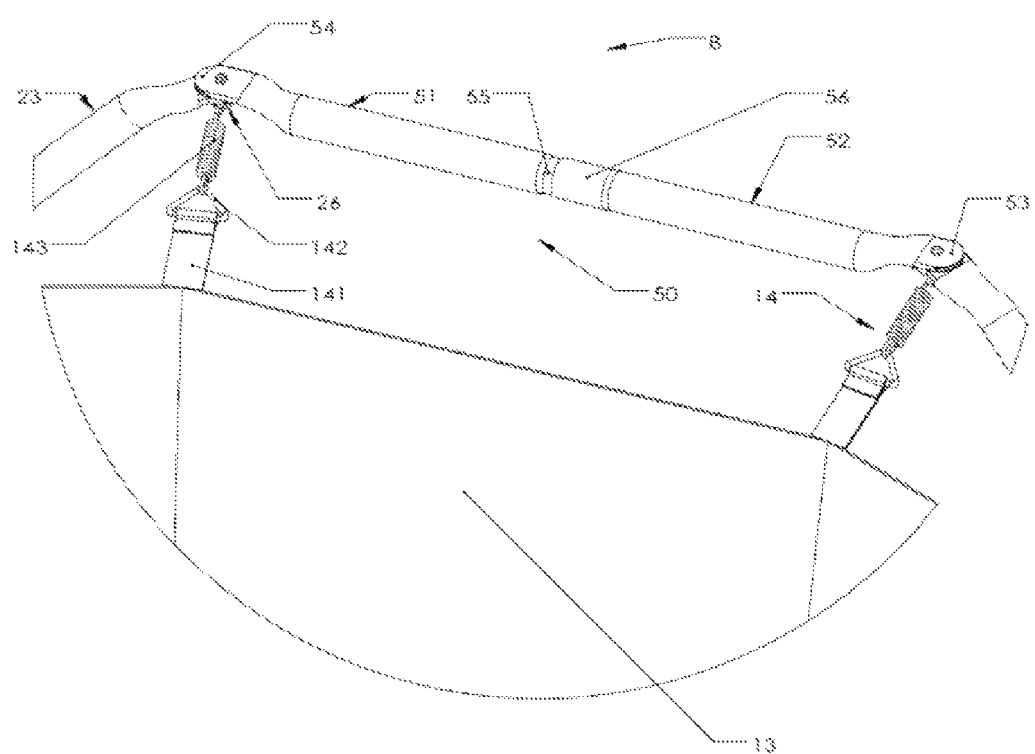
FIG. 15 is an expansive view in detail of area B from FIG. 13.

FIG. 13 illustrates a further embodiment of the present invention, where the top of each safety pole after crossing in the same unit is connected to the top of a safety pole from an adjacent safety unit via a connection pole at area B, with details illustrated in FIG. 15. Details of various connections at area A are illustrated in FIG. 14.

FIG. 14 is an expanded view of area A from FIG. 13, detailing the spring 12 connecting the frame tube 15 and the mat 11. The spring 12 comprises a pair of hooked ends 121 and 122. Hooked end 121 in this particular example, latches onto the slits 18 on the frame tube 15. Hooked end 122 latches onto a corner of a triangular link 111. The opposing edge of the triangular link 111 can be sewed onto the edge of the mat 11.

FIG. 15 is an expanded view of area B from FIG. 13 to detail the connection pole 50. The connection pole 50 comprises a first section 51 and a second section 52, which are connected to each other via locking features such as a spring loaded button on one end 55, and a corresponding opening on the other end 56. A corresponding view of the adjacent connection pole 50 with its first and second sections, 51 and 52, separated is illustrated in FIG. 11

Figure 16:
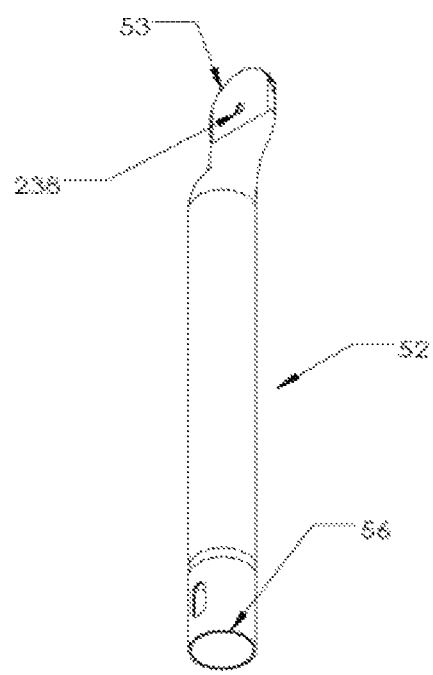
FIG. 16 illustrates a section of the connection pole.

As illustrated in FIGS. 11 and 12, the end of an upper section of the safety pole can comprise a flat surface area 231, with an opening at 234. This flat surface area 231 can be aligned and matched with the flat end 53 of either section of the connection pole 50 (as shown in FIG. 16). A pin 26, as illustrated in FIGS. 11 and 15, with a loop end joins the connection pole and the safety unit, by linking the openings 234 and 238 (in FIG. 16) together.

FIG. 15 further illustrates the connection of the safety net 13 to the top edge of the trampoline via a spring connection 14. The spring connection comprises a spring 143, a triangle link 142, and a piece of fabric extension 141. One end of spring 143 latches onto the loop end of pin 26, and the other end latches onto a corner of a triangular link 142. The opposing edge of the triangular link 142 can be sewed onto a piece of fabric extension 141, and then in turn to the edge of the safety net 13. The fabric extension 141 can be shortened or lengthened in order to adjust the tension asserted onto the safety net 13.

Figure 17:
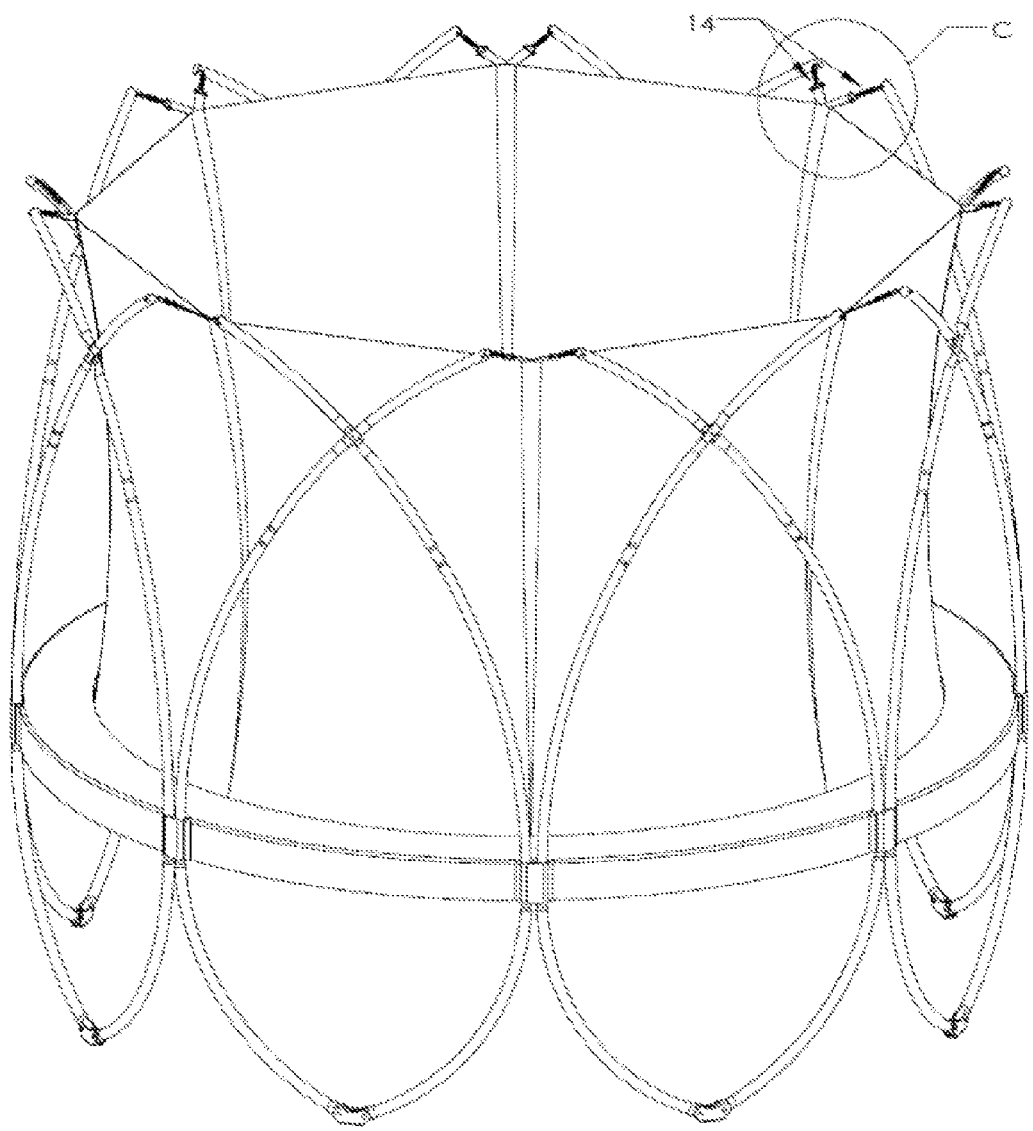
FIG. 17 is a schematic illustration of a trampoline, where the top of the safety unit is directly connected to the safety net via a spring connection, according to some embodiments of the present invention.
Figure 18:
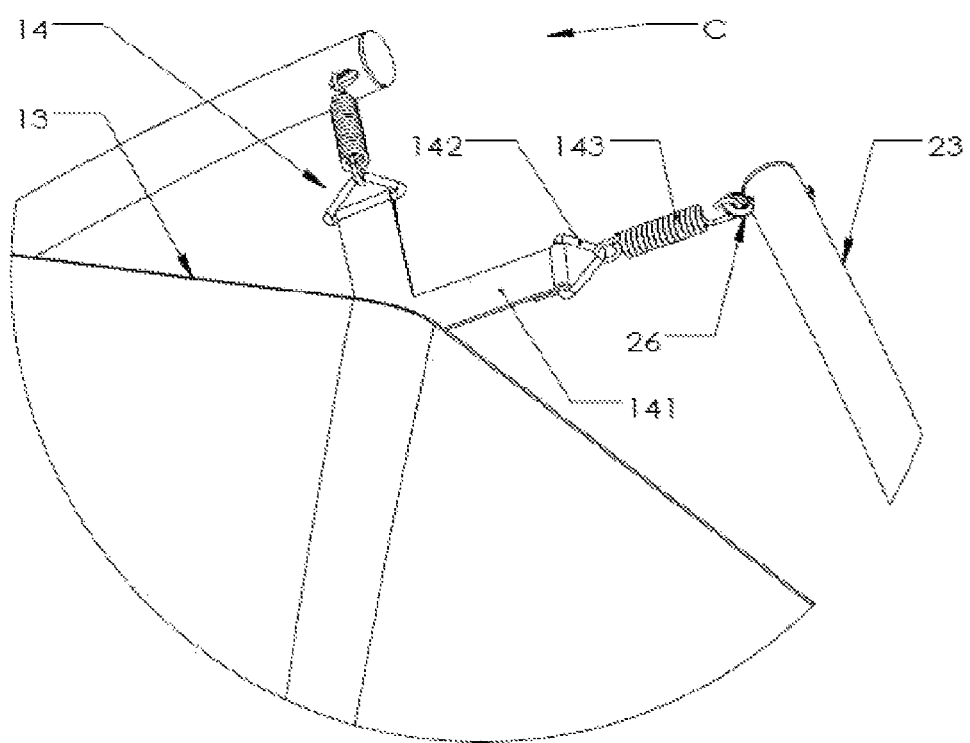
FIG. 18 is an expansive view in detail of area C from FIG. 17.

FIG. 17 illustrates one of the embodiments of the present invention, where the top of each safety pole is connected to the top of the safety net directly via a spring connection 14. Area C is expanded with a detailed illustration in FIG. 18. One end of spring 143 latches onto the loop end of pin 26 on the upper section 23 of the safety pole. The other end latches onto a corner of a triangular link 142. The opposing edge of the triangular link 142 can be sewed onto a piece of fabric extension 141. In this particular embodiment, both ends of the adjacent spring connections can be joined together first, and then in turn to the edge of the safety net 13

Figure 19:
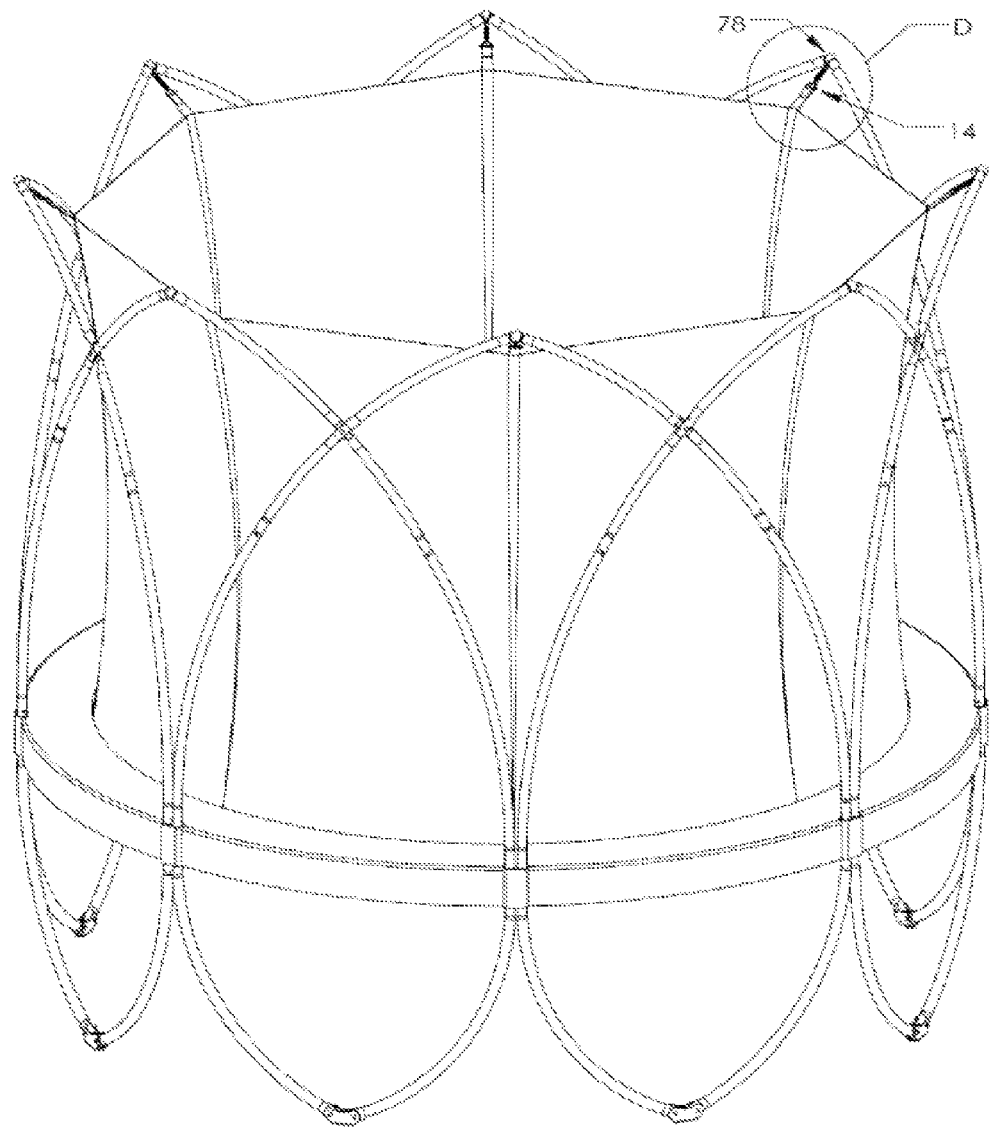
FIG. 19 is a schematic illustration of a trampoline, where the top of a safety unit is connected to the top of an adjacent safety unit via a sphere joint, according to some embodiments of the present invention.

FIG. 19 illustrates another embodiment of the present invention, where the top of each safety pole after crossing in the same unit is connected to the top of a safety pole from an adjacent safety unit via a sphere joint 78, and then in turn connected to the edge of the safety net via a spring connection 14. Area D is expanded with a detailed illustration in FIG. 20.

Figure 20:
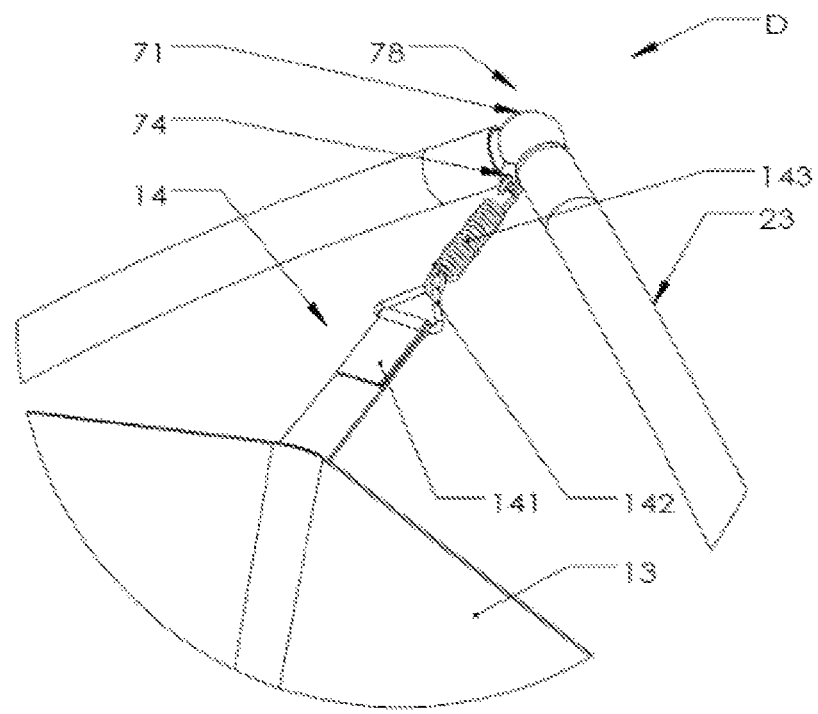
FIG. 20 is an expansive view in detail of area D from FIG. 19.
Figure 21:
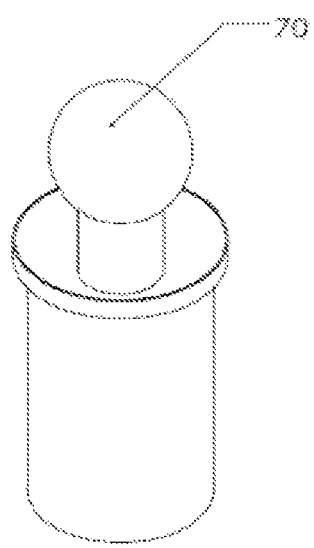
FIG. 21 is a schematic illustration of a sphere end of a sphere joint.
Figure 22:
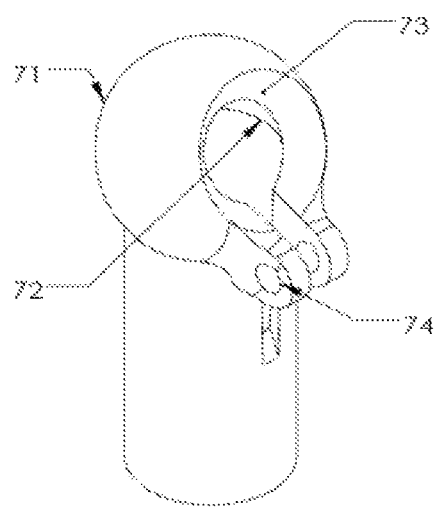
FIG. 22 is a schematic illustration of a housing end of the sphere joint.

FIGS. 20, 21, and 22 illustrate the sphere joint 78 in more detail. The sphere joint comprises a sphere end 70 and a housing end 71. The housing end further comprises an opening 73, which is large enough to allow the sphere end 70 to snap into the inner chamber 72 of the housing end. The sizes of the sphere end and the housing end are manufactured such that they allow relative rotation of the sphere end 70 inside of the chamber 72. The spherical and smooth shape of the housing end also prevents scraping injuries should the jumper accidentally bump into it top of the safety poles.

A spring connection 14 latches onto the openings 74 on the housing end 71, and then in turn connects to the top edge of the safety net 13.

Figure 23:
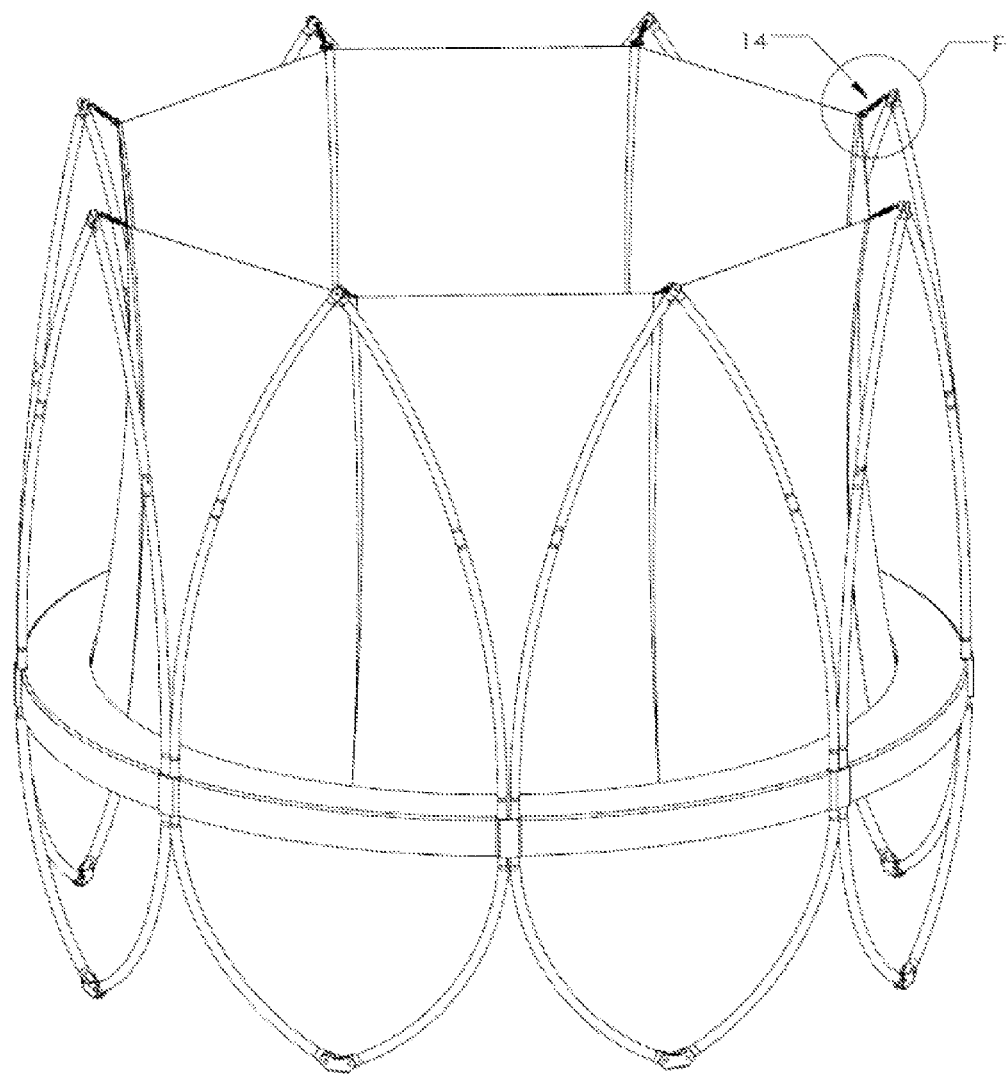
FIG. 23 is a schematic illustration of a trampoline, where the tops of a safety unit are connected together within the same unit, according to some embodiments of the present invention.
Figure 24:
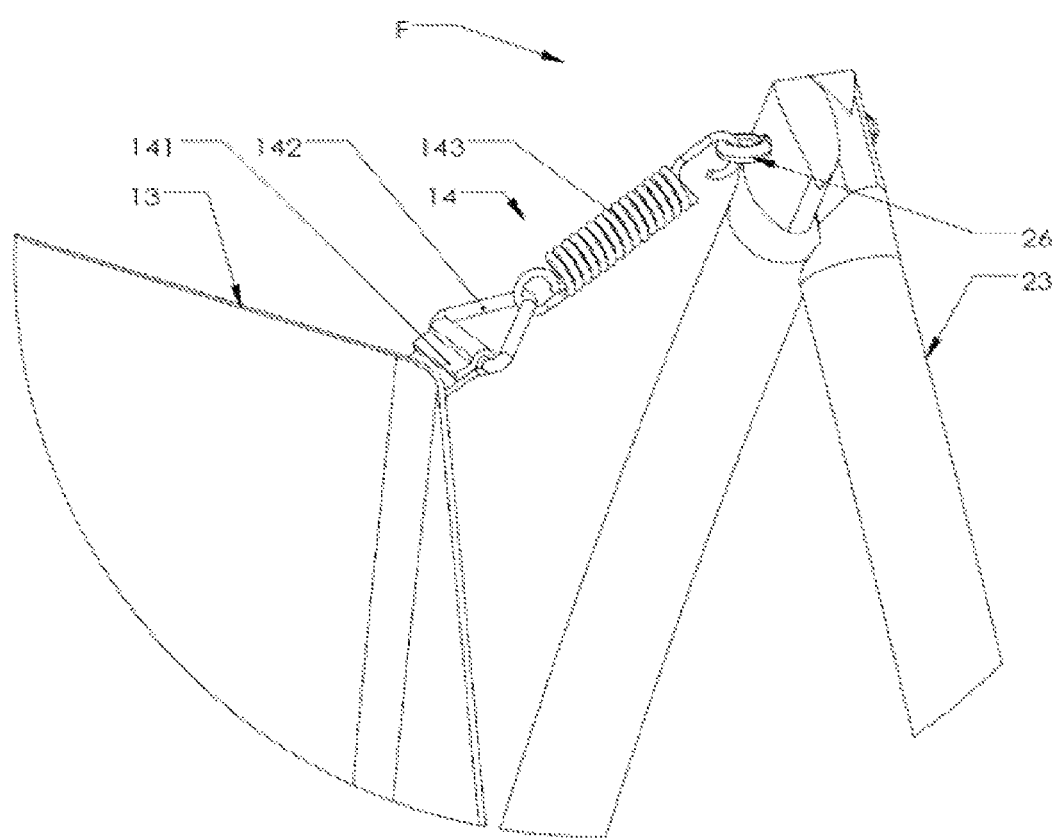
FIG. 24 is an expansive view in detail of area F from FIG. 23.

FIG. 23 illustrates yet another embodiment of the present invention, where the top of the safety poles within the same unit are joined together at the top ends without crossing each other. Area F is expanded with a detailed illustration in FIG. 24. Both ends of the upper sections of the safety poles within the same safety unit are joined together by a pin 26 with a loop end. A spring connection 14 latches onto the loop end, and then in turn connects to the top edge of the safety net 13.

Figure 25:
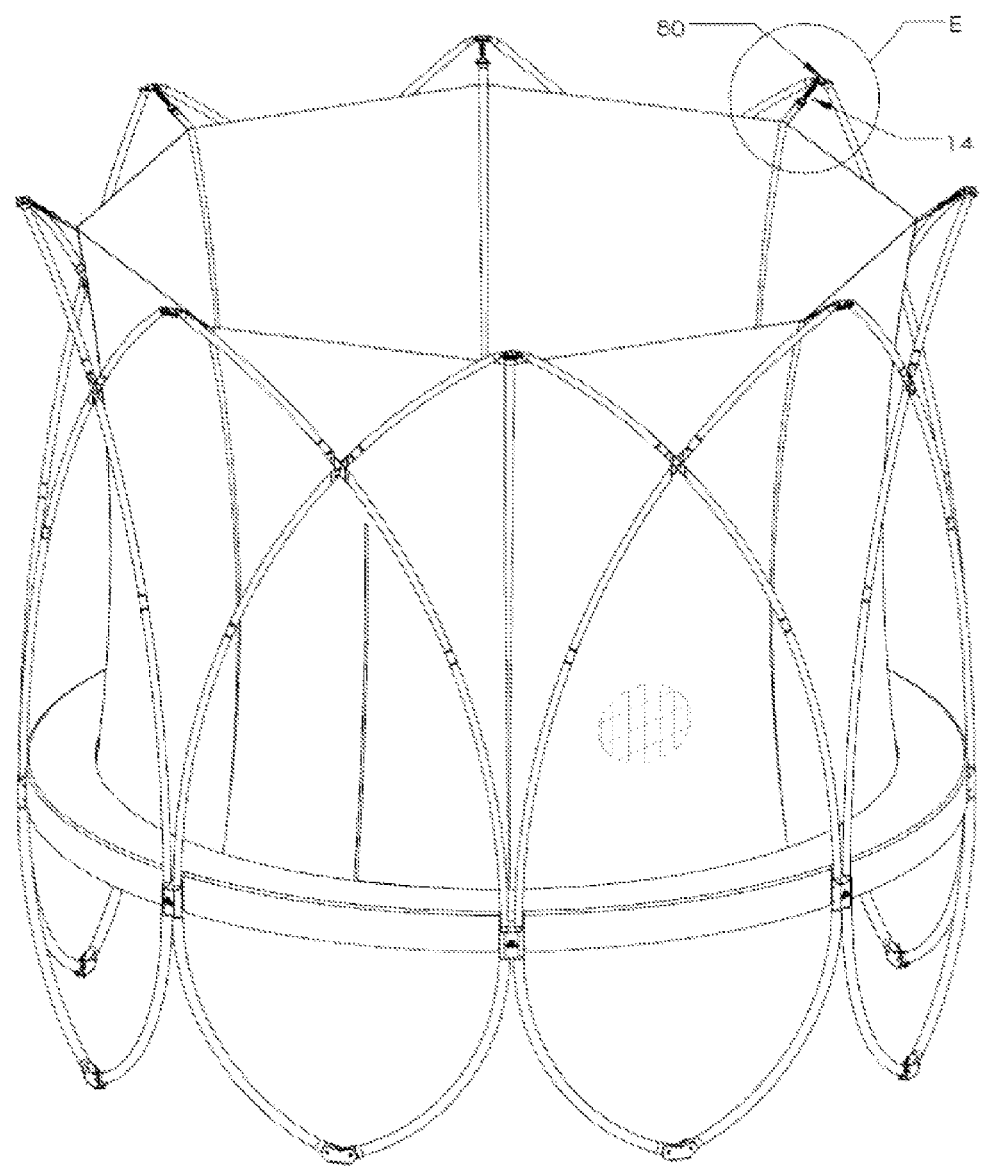
FIG. 25 is a schematic illustration of a trampoline, where the top of a safety unit is connected to the top of an adjacent safety unit via a clamp, according to some embodiments of the present invention.
Figure 26:
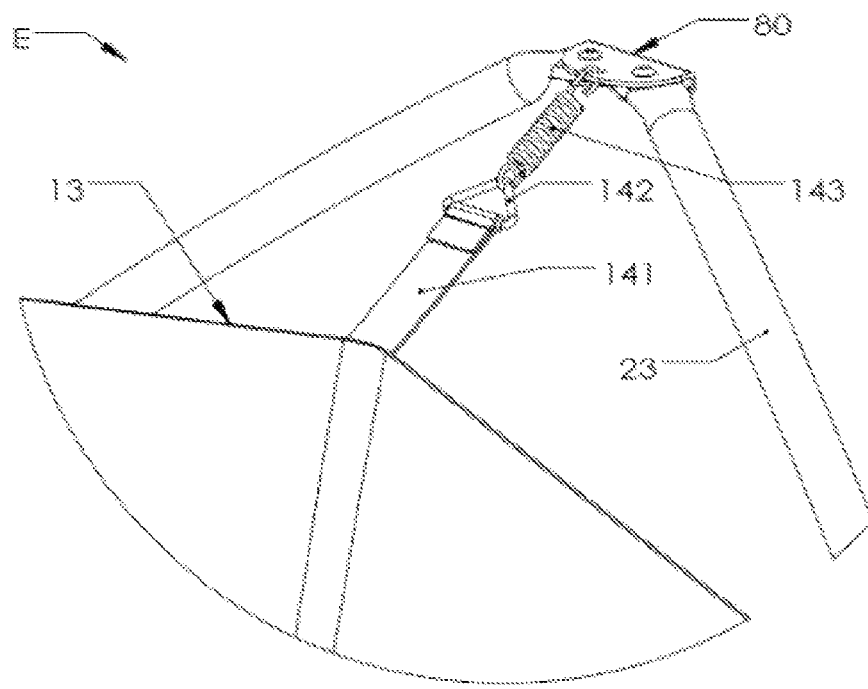
FIG. 26 is an expansive view in detail of area E from FIG. 25.
Figure 27:
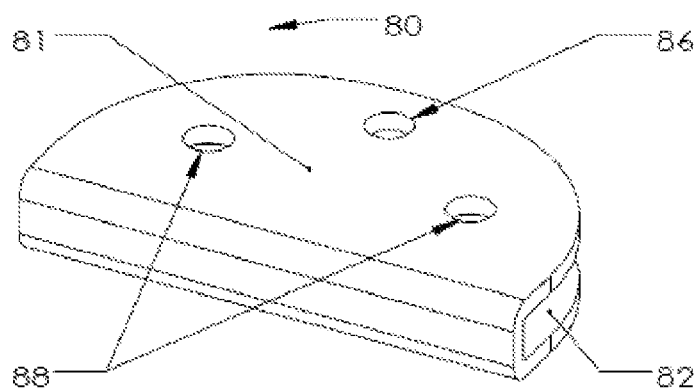
FIG. 27 is a schematic drawing of the clamp by itself viewed from the top.
Figure 28:
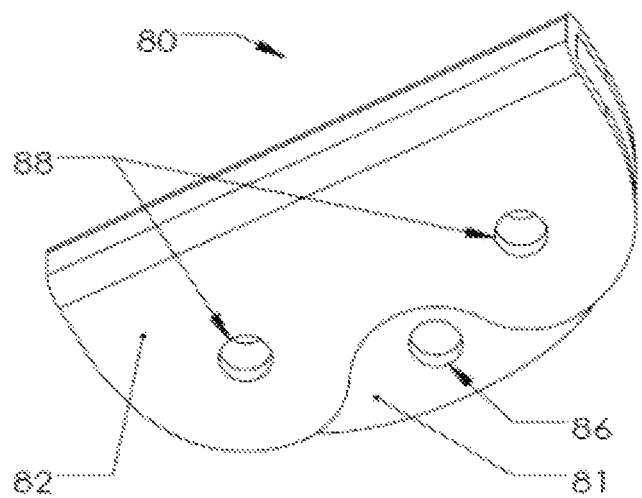
FIG. 28 is a schematic drawing of the clamp by itself viewed from the bottom.

FIG. 25 illustrates an embodiment of the present invention, where the top of each safety pole after crossing in the same unit is connected to the top of a safety pole from an adjacent safety unit at area E via a clamp 80 as shown in FIGS. 26, 27, and 28. Area E is expanded with a detailed illustration in FIG. 26.

The clamp 80 comprises a top surface 81, and a U shaped bottom surface 82, with corresponding openings 88. A gap between the top and bottom surfaces 81 and 82 allows the insertion of the flat ends of the upper section of the safety poles 23, and can then secure the two tips of the pole via pins through the openings 88. The top surface of the clamp also comprises a third opening 86, to allow attachment of the spring connection 14 to the top edge of the safety net.

Figure 29:
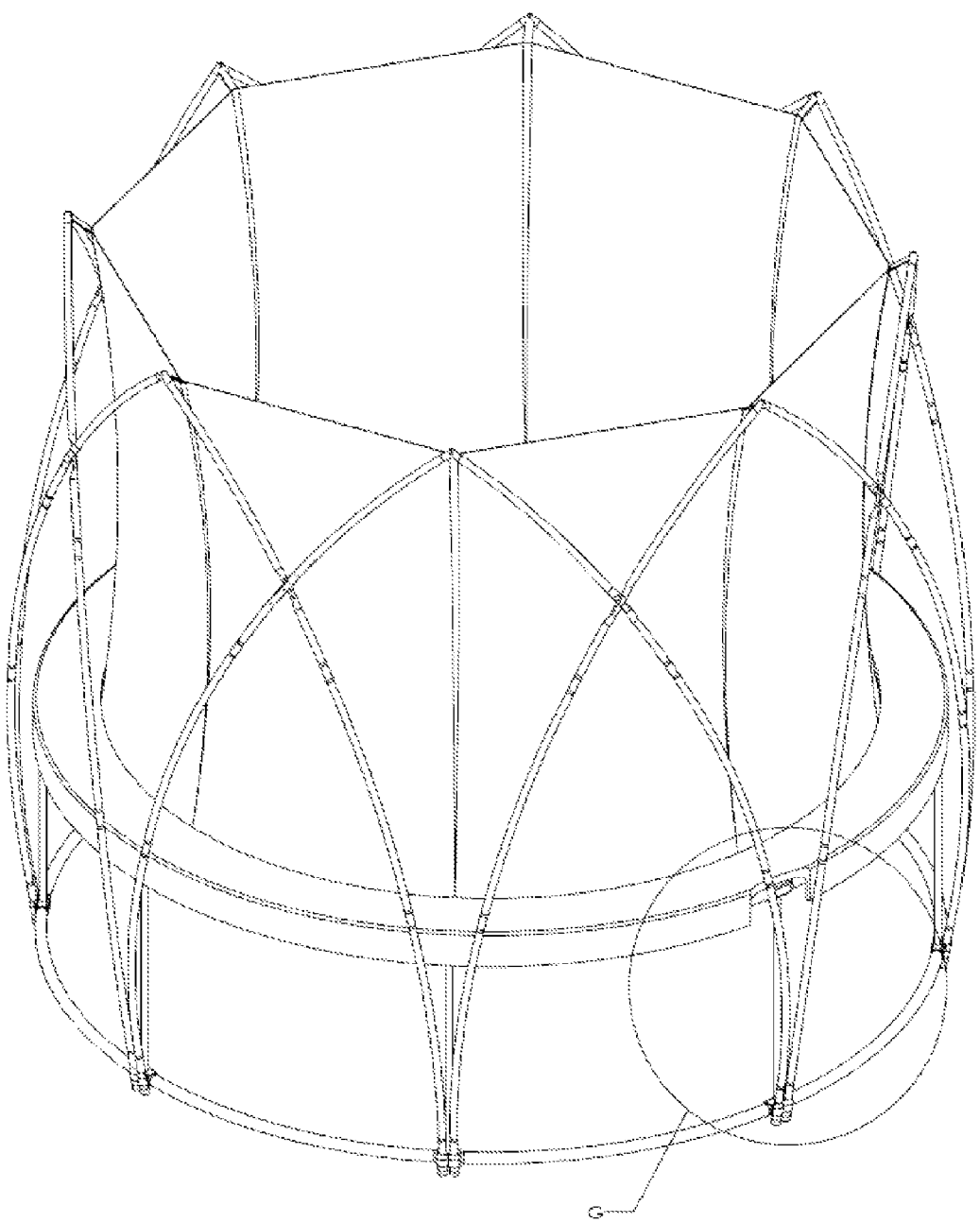
FIG. 29 is a schematic illustration of a trampoline, where the lower ends of the safety units are joined at ground level, according to some embodiments of the present invention.

FIG. 29 illustrates yet another embodiment of the present invention, where the safety poles are joined to a locking mechanism adapted to sit on the ground directly. Area G is an expansive view of the locking mechanism as illustrated in FIG. 30

Figure 30:
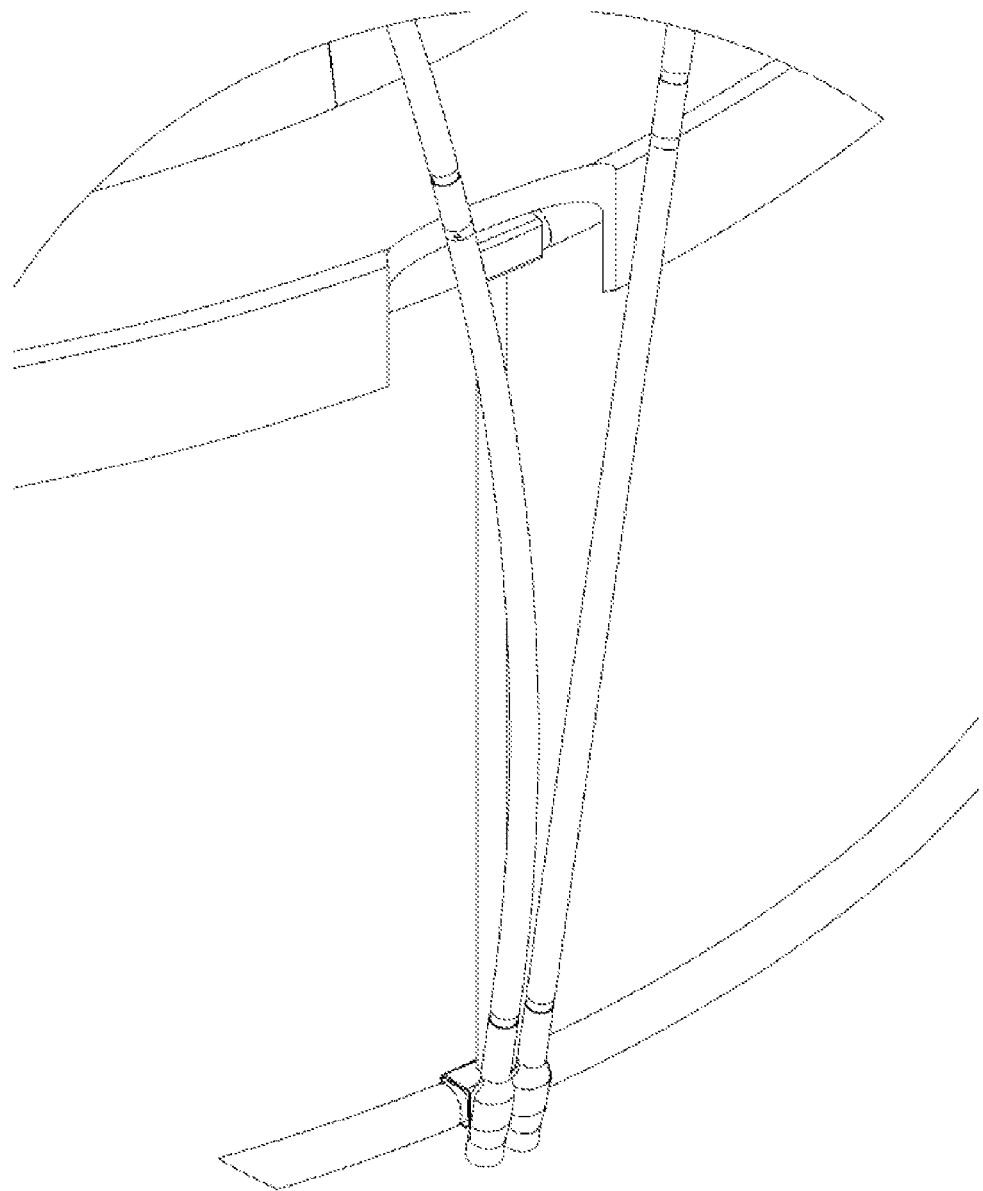
FIG. 30 is an expansive view in detail of area G from FIG. 29.

FIG. 30 illustrates a locking mechanism adapted to sit on the ground directly. The receiving end and existing end of the locking mechanism is connected to sections of frame tubes that are also sitting on the ground. No leg units are necessary in this arrangement. The bottom ends of the safety poles are secured via the same mechanism as illustrated previously in the off the ground set ups.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open United as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A trampoline comprising:
    an enclosed frame connected to a mat for bouncing thereon, wherein the enclosed frame further comprises a plurality of frame tubes and locking mechanisms, with one frame tube being locked at a first end of each locking mechanism and another frame tube being locked at a second end;
    a plurality of leg units, wherein each leg unit further comprises a foot joint and at least two leg poles connected to adjacent locking mechanisms via a plurality of insertion tubes around the enclosed frame to raise the enclosed frame and the mat above ground;
    a plurality of safety units connected to adjacent locking mechanisms via the plurality of insertion tubes and extending upwards to form an enclosure around the mat, wherein each safety unit further comprises at least two safety poles, each with a first end locked at the insertion tube from an adjacent locking mechanism, the at least two safety poles extending upwards to terminate at a second end at an upper section of the safety unit after crossing each other at a location above the enclosed frame; and
    a safety net connected to the second ends of the safety poles via a plurality of spring connections, and to an outer edge of the mat at a plurality of locations around the mat.

2. The trampoline of claim 1, wherein the frame tubes further comprise at least one set of slits to allow attachment of springs to the edge of the mat.

3. The trampoline of claim 1, wherein each locking mechanism comprises:
    a connection tube with a receiving end and an exiting end;
    at least one insertion tube attached from outside to the connection tube to form a T junction, wherein the insertion tube further comprises pairs of openings aligned with corresponding locking features on the leg units and the safety units; and
    a reinforcement piece attached to the connection tube and to the insertion tube.

4. The trampoline of claim 1, wherein each leg unit further comprises:
    a foot joint with a bottom surface resting on a ground surface and at least two upward U shaped plates facing each other; and
    at least two leg poles with bottom ends rotatably attached to the upward U shaped plates on the foot joint via pins, and upper ends attached to adjacent locking mechanisms via insertion tubes on the enclosed frame.

5. The trampoline of claim 4, wherein the bottom surface of each foot joint comprises anchors that can be driven into the ground surface to secure the trampoline at a fixed location.

6. The trampoline of claim 1, wherein the safety poles further comprise interlocking sections lengthwise.

7. The safety unit of claim 1, wherein an upper section of each safety pole comprises a complimentary surface with an opening rotatably attachable to an opposing safety pole at a corresponding location in the same safety unit to form an X junction.

8. The safety unit of claim 1, wherein the second end of each safety pole is attached to the second end of a safety pole from an adjacent safety unit.

9. The trampoline of claim 1, wherein the second end of each safety pole is attached to a first end of a connecting pole, and a second end of the connecting pole is attached to the second end of a safety pole from an adjacent safety unit.

10. The trampoline of claim 1, wherein the second ends of the safety poles are directly connected to an edge of the safety net via a spring connection.

11. The trampoline of claim 1, wherein the safety net is connected to the safety units via a spring connection, comprising a spring, latching onto a corner of a triangular link, with an opposing edge of the triangular link secured onto a piece of fabric extension.

12. The trampoline of claim 9, wherein the connecting pole further comprises lengthwise interlocking sections.

13. A trampoline comprising:
an enclosed frame connected to a mat for bouncing thereon, wherein the enclosed frame further comprises a plurality of frame tubes and locking mechanisms, with one frame tube being locked at a first end of each locking mechanism and another frame tube being locked at a second end;
a plurality of leg units, wherein each leg unit further comprises a foot joint and at least two leg poles connected to adjacent locking mechanisms via a plurality of insertion tubes around the enclosed frame to raise the enclosed frame and the mat above ground;
a plurality of safety units connected to adjacent locking mechanisms via the plurality of insertion tubes and extending upwards to form an enclosure around the mat, wherein each safety unit further comprises at least two safety poles, each with a first end locked at the insertion tube from an adjacent locking mechanism, the at least two safety poles extending upwards to terminate at a second end after crossing each other at a location above the enclosed frame, and the second end of each safety pole is attached to the second end of a safety pole from an adjacent safety unit via a sphere joint, comprising a housing end and a sphere end, the housing end comprising a cavity to allow entry of the sphere end, to allow relative rotation between the cavity and the sphere end, and to block the exit of the sphere end; and
a safety net connected to the second ends of the safety poles via a plurality of spring connections, each secured onto a pair of openings on the sphere joint, and to an outer edge of the mat at a plurality of locations around the mat.

14. A trampoline comprising:
an enclosed frame connected to a mat for bouncing thereon, wherein the enclosed frame further comprises a plurality of frame tubes and locking mechanisms, with one frame tube being locked at a first end of each locking mechanism and another frame tube being locked at a second end;
a plurality of leg units, wherein each leg unit further comprises a foot joint and at least two leg poles connected to adjacent locking mechanisms via a plurality of insertion tubes around the enclosed frame to raise the enclosed frame and the mat above ground;
a plurality of safety units connected to adjacent locking mechanisms via the plurality of insertion tubes and extending upwards to form an enclosure around the mat, wherein each safety unit further comprises at least two safety poles, each with a first end locked at the insertion tube from an adjacent locking mechanism, the at least two safety poles extending upwards to terminate at a second end after crossing each other at a location above the enclosed frame, and the second end of each safety pole is attached to the second end of a safety pole from an adjacent safety unit via a clamp, comprising pairs of openings to secure each second end; and
a safety net connected to the second ends of the safety poles via a plurality of spring connections, each secured onto a third opening on the clamp, and to an outer edge of the mat at a plurality of locations around the mat.

15. A trampoline comprising:
a first enclosed frame connected to a mat for bouncing;
a second enclosed frame, wherein the second enclosed frame further comprises a plurality of frame tubes and locking mechanisms, with one frame tube being locked at a first end of each of the locking mechanisms and another frame tube being locked at a second end;
a plurality of leg poles connected around the first enclosed frame to raise the first enclosed frame and the mat above ground;
a plurality of safety units connected to the second enclosed frame at ground level extending upwards to form an enclosure around both frames and the mat, wherein the safety units each further comprise at least two safety poles with lower ends joined at ground level to a lower end of a safety pole from an adjacent safety unit via adjacent locking mechanisms, and each of said safety units having an upper section of the safety poles leading toward each other and joined together at an upper section of the safety unit; and
a safety net with a top edge connected to top ends of the safety units via spring connections, and a bottom edge connected to an outer edge of the mat at a plurality of locations around the mat.

16. A trampoline comprising:
an enclosed frame connected to a mat for bouncing thereon, wherein the enclosed frame further comprises a plurality of frame tubes and locking mechanisms, with one frame tube being locked at a first end of each of the locking mechanisms and another frame tube being locked at a second end;
a plurality of leg units, wherein each leg unit further comprises a foot joint and at least two leg poles connected to adjacent locking mechanisms via a plurality of insertion tubes around the enclosed frame to raise the enclosed frame and the mat above ground;
a plurality of safety units connected to adjacent locking mechanisms via the plurality of insertion tubes and extending upwards to form an enclosure around the mat, wherein each safety unit further comprises at least two safety poles, each with a first end locked at the insertion tube from an adjacent locking mechanism, the at least two safety poles extending upwards to terminate and to connect with each other at a second end via a pin; and
a safety net connected to the second ends of the safety poles via a plurality of spring connections secured onto a loop end on the pin, and to an outer edge of the mat at a plurality of locations around the mat.

* * * * *